US 7,509,392 B2

(12) United States Patent
Shen et al.

(10) Patent No.: US 7,509,392 B2
(45) Date of Patent: Mar. 24, 2009

(54) CREATING AND REMOVING APPLICATION SERVER PARTITIONS IN A SERVER CLUSTER BASED ON CLIENT REQUEST CONTEXTS

(75) Inventors: Jinmei Shen, Rochester, MN (US); Hao Wang, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 818 days.

(21) Appl. No.: 11/089,466

(22) Filed: Mar. 24, 2005

(65) Prior Publication Data

US 2006/0218261 A1    Sep. 28, 2006

(51) Int. Cl.
G06F 15/16 (2006.01)
G06F 17/00 (2006.01)

(52) U.S. Cl. .................. 709/215; 709/201; 709/203; 709/216; 709/223; 711/6; 711/170; 711/171; 711/172; 711/173; 711/153; 707/1; 707/3; 707/100; 707/101; 707/10

(58) Field of Classification Search .............. 709/223, 709/215, 201, 203, 216; 711/6, 170–173, 711/153; 707/1, 3, 100–101, 10
See application file for complete search history.

(56) References Cited

U.S. PATENT DOCUMENTS

| | | | | |
|---|---|---|---|---|
| 5,117,350 A * | 5/1992 | Parrish et al. | .................. | 711/1 |
| 5,551,027 A * | 8/1996 | Choy et al. | .................. | 707/201 |
| 5,960,194 A * | 9/1999 | Choy et al. | .................. | 707/102 |
| 6,336,134 B1 * | 1/2002 | Varma | .................. | 709/205 |
| 6,438,733 B1 * | 8/2002 | Clement | .................. | 716/4 |
| 6,516,372 B1 * | 2/2003 | Anderson et al. | .................. | 710/300 |
| 6,901,497 B2 * | 5/2005 | Tashiro et al. | .................. | 711/173 |
| 6,973,654 B1 * | 12/2005 | Shutt et al. | .................. | 718/105 |
| 7,028,157 B2 * | 4/2006 | Block et al. | .................. | 711/173 |
| 7,231,504 B2 * | 6/2007 | Kashyap et al. | .................. | 711/173 |
| 7,363,626 B2 * | 4/2008 | Koutharapu et al. | .................. | 718/105 |
| 7,380,086 B2 * | 5/2008 | Archambault et al. | .................. | 711/170 |
| 7,406,522 B2 * | 7/2008 | Riddle | .................. | 709/226 |
| 2003/0056063 A1 * | 3/2003 | Hochmuth et al. | .................. | 711/152 |
| 2003/0061263 A1 * | 3/2003 | Riddle | .................. | 709/104 |
| 2004/0030755 A1 * | 2/2004 | Koning et al. | .................. | 709/217 |
| 2004/0243618 A1 * | 12/2004 | Malaney et al. | .................. | 707/102 |
| 2005/0108362 A1 * | 5/2005 | Weinert et al. | .................. | 709/217 |
| 2005/0283658 A1 * | 12/2005 | Clark et al. | .................. | 714/11 |

(Continued)

Primary Examiner—Alina N. Boutah
(74) Attorney, Agent, or Firm—Owen J. Gamon

(57) ABSTRACT

A method, apparatus, system, and signal-bearing medium that, in an embodiment, determine an application server partition based on the context of a request from a client, and send the request to the application server partition if the application server partition exists. If the application server partition does not exist, the application server partition is created based on a creation rule, and the request is then sent to the application server partition if the request context is valid, as determined by a validation rule. Periodically, a remove rule is compared to a condition of the application server partition, and if the remove rule is met, the application server partition is removed. The condition may include, in various embodiments, the usage time and frequency of use of the application server partition or performance criteria. In an embodiment, the validation rule, the creation rule, and the remove rule may change over time. In this way, application server partitions may be dynamically created and removed based on the context of client requests and rules.

14 Claims, 4 Drawing Sheets

U.S. PATENT DOCUMENTS

2006/0031242 A1* 2/2006 Hall et al. .................. 707/101
2006/0242290 A1* 10/2006 Ishizaki et al. .............. 709/223
2008/0147956 A1* 6/2008 Rawson ........................ 711/6

* cited by examiner

CREATING AND REMOVING APPLICATION SERVER PARTITIONS IN A SERVER CLUSTER BASED ON CLIENT REQUEST CONTEXTS

FIELD

An embodiment of the invention generally relates to computers. In particular, an embodiment of the invention generally relates to on-demand servers.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated and complex computer software has evolved to take advantage of the higher performance of the hardware, resulting in computer systems today that are much more powerful than just a few years ago.

Years ago, computers were stand-alone devices that did not communicate with each other, but today, computers are increasingly connected in networks and one computer, called a client, may request another computer, called a server, to perform an operation. With the advent of the Internet, this client/server model is increasingly being used in online businesses and services, such as online auction houses, stock trading, banking, commerce, and information storage and retrieval.

With the client/server model comes many challenges. One server may receive requests of differing types from many different clients, and the server may have many applications to process these requests. Further, the type and number of requests that a server receives may change dramatically over time, and one type of request may be frequent while another type may be rare. For example, brokerage clients may send requests to view their account balance and request financial information far more frequently than they send requests to buy or sell stocks, the applications that process these requests may be different, and the volume and type of requests may change dramatically over time. For example, a server will receive far more requests to trade stocks on dates and times when the stock market is open than when it is closed.

Yet, despite the dynamic nature and different types of client requests, organizations often initially configure their servers based on the planned and estimated requirements of their intended customers and users and then do not change the server configuration over time. This results in certain server resources being active and available for use but under-utilized while other server resources are over-utilized, leading to reduced performance, reduced user satisfaction, and increased cost.

Thus, what is needed is a better technique for servers to respond to the dynamic nature of client requests.

SUMMARY

A method, apparatus, system, and signal-bearing medium are provided that, in an embodiment, determine an application server partition based on a context of a request from a client, and send the request to the application server partition if the application server partition exists. If the application server partition does not exist, the application server partition is created based on a creation rule, and the request is then sent to the application server partition if the request context is valid, as determined by a validation rule. Periodically, a remove rule is compared to a condition of the application server partition, and if the remove rule is met, the application server partition is removed. The condition may include, in various embodiments, the usage time and frequency of use of the application server partition or performance criteria. In an embodiment, the validation rule, the creation rule, and the remove rule may change over time. In this way, application server partitions may be dynamically created and removed based on the context of client requests and rules.

BRIEF DESCRIPTION OF THE DRAWING

Various embodiments of the present invention are hereinafter described in conjunction with the appended drawings.

It is to be noted, however, that the appended drawings illustrate only example embodiments of the invention, and are therefore not considered limiting of its scope, for the invention may admit to other equally effective embodiments.

DETAILED DESCRIPTION

Figure 1:
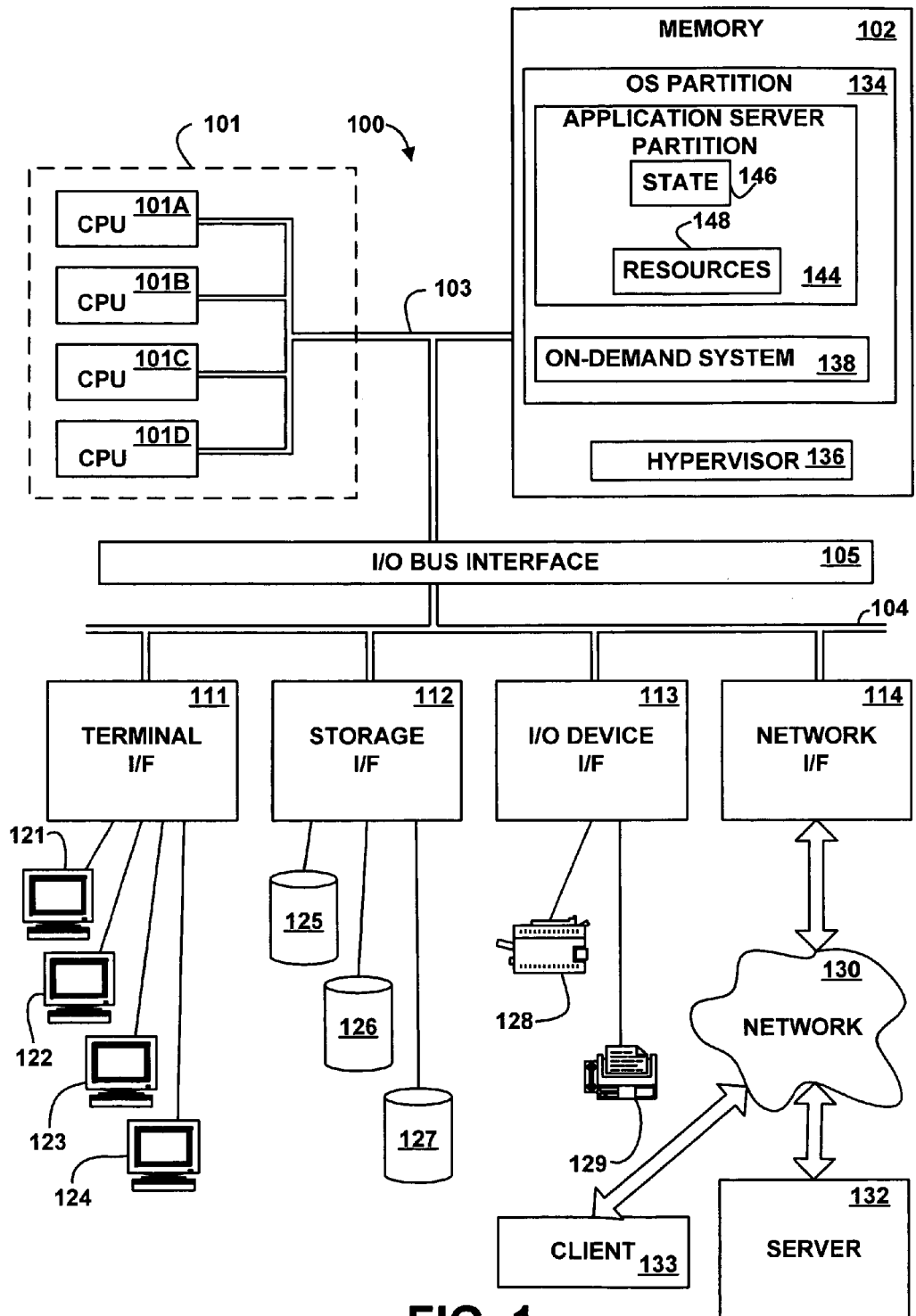
FIG. 1 depicts a block diagram of an example system for implementing an embodiment of the invention.

Referring to the Drawings, wherein like numbers denote like parts throughout the several views, FIG. 1 depicts a high-level block diagram representation of a computer system 100 connected via a network 130 to a server 132 and a client 133, according to an embodiment of the present invention. The terms "computer system," "server," and "client," are used for convenience only, any appropriate electronic devices may be used, in various embodiments the computer system 100 may operate as either a client or a server, and a computer system or electronic device that operates as a client in one context may operate as a server in another context. The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as a processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may further be distributed and associated with different CPUs or sets of CPUs, as is known in any of various so-called non-uniform memory access (NUMA) computer architectures.

The memory 102 is illustrated as containing the primary software components and resources utilized in implementing a logically-partitioned computing environment on the computer 100, including a plurality of logical operating system partitions 134 managed by a partition manager or hypervisor 136. Although the operating system partitions 134 and the hypervisor 136 are illustrated as being contained within the memory 102 in the computer system 100, in other embodiments some or all of them may be on different computer systems, e.g., the server 132, and may be accessed remotely, e.g., via the network 130. Further, the computer system 100 may use virtual addressing mechanisms that allow the programs of the computer system 100 to behave as if they only have access to a large, single storage entity instead of access to multiple, smaller storage entities. Thus, while the operating system partitions 134 and the hypervisor 136 are illustrated as residing in the memory 102 in the computer 100, these elements are not necessarily all completely contained in the same storage device, or in the same computer, at the same time.

Each of the logical operating system partitions 134 utilizes an unillustrated operating system, which controls the primary operations of the logical operating system partition 134 in the same manner as the operating system of a non-partitioned computer. For example, each operating system may be implemented using the i5OS operating system available from International Business Machines Corporation, but in other embodiments the operating system may be Linux, AIX, UNIX, Microsoft Windows, or any appropriate operating system. Also, some or all of the operating systems may be the same or different from each other. Any number of logical operating system partitions 134 may be supported as is well known in the art, and the number of the logical operating system partitions 134 resident at any time in the computer 100 may change dynamically as the logical operating system partitions 134 are added or removed from the computer 100.

Each of the logical operating system partitions 134 executes in a separate, or independent, memory space, and thus each logical operating system partition 134 acts much the same as an independent, non-partitioned computer from the perspective of each application server partition 144 that executes in each such logical operating system partition 134. As such, user applications, e.g., the application server partitions 144, typically do not require any special configuration for use in a partitioned environment. Given the nature of the logical operating system partitions 134 as separate virtual computers, it may be desirable to support inter-partition communication to permit the logical partitions to communicate with one another as if the logical partitions were on separate physical machines. Although the logical operating system partitions 134 are illustrated as operating as virtual computers within the computer 100, in another embodiment, one of the logical operating system partitions 134 may operate as the entire computer, or as a group of computers, such as one or more servers 132 connected via the network 130. A group of computers, which includes one or more computers acting as servers, is referred to as a server cluster.

In some embodiments, it may be desirable to support an unillustrated virtual local area network (LAN) adapter associated with the hypervisor 136 to permit the logical operating system partitions 134 to communicate with one another via a networking protocol such as the Ethernet protocol. In another embodiment, the virtual network adapter may bridge to a physical adapter, such as the network interface adapter 114. Other manners of supporting communication between partitions may also be supported consistent with embodiments of the invention.

Although the hypervisor 136 is illustrated as being within the memory 102, in other embodiments, all or a portion of the hypervisor 106 may be implemented in firmware or hardware. The hypervisor 136 may perform both low-level partition management functions, such as page table management and may also perform higher-level partition management functions, such as creating and deleting partitions, concurrent I/O maintenance, allocating processors, memory and other hardware or software resources to the various operating system partitions 134. In another embodiment, the hypervisor 136 is optional, not present, or not used and the operating system partitions 134 may also not be present or not used.

The hypervisor 136 statically and/or dynamically allocates to each logical operating system partition 134 a portion of the available resources in computer 100. For example, each logical operating system partition 134 may be allocated one or more of the processors 101 and/or one or more hardware threads, as well as a portion of the available memory space. The logical operating system partitions 134 can share specific software and/or hardware resources such as the processors 101, such that a given resource may be utilized by more than one logical partition. In the alternative, software and hardware resources can be allocated to only one logical operating system partition 134 at a time. Additional resources, e.g., mass storage, backup storage, user input, network connections, and the I/O adapters therefore, are typically allocated to one or more of the logical operating system partitions 134. Resources may be allocated in a number of manners, e.g., on a bus-by-bus basis, or on a resource-by-resource basis, with multiple logical partitions sharing resources on the same bus. Some resources may even be allocated to multiple logical partitions at a time. The resources identified herein are examples only, and any appropriate resource capable of being allocated may be used.

Each operating system partition 134 includes one or more application server partitions 144 and an on-demand system 138. Each application server partition 144 is an independent routable unit of an application, and any number of application server partitions 144 may exist, including tens of thousands. Each application server partition 144 includes an application state 146 and application resources 148. The application state 146 represents an object state for the application server partition 144 for a set of the clients 133, and the application resources 148 represent data cache, security data, and/or a database connection for that application server partition 144 and that set of clients 133. Thus, the application state 146 and the application resources 148 customize an application for a particular set of clients 133. Applications may be partitioned via a key-based partitioning technique, a hash-based partitioning technique, a combination of key-based partitioning and hash-based partitioning, or via any other appropriate technique. In an embodiment, the operating system partitions 134 are not necessary, and the application server partitions 144 may operate independently without an operating system partition.

The on-demand system 138 creates, activates, and removes the application server partitions 144. The on-demand system 138 further receives requests from the clients 133, validates the requests, and routes the requests to the appropriate application server partition 144. In an embodiment, the on-demand system 138 includes instructions capable of executing on the processor 101 or statements capable of being interpreted by instructions executing on the processor 101 to perform the functions as further described below with reference to FIGS. 2, 3, and 4. In another embodiment, the on-demand system 138 may be implemented in microcode or firmware. In another embodiment, the on-demand system 138 may be implemented in hardware via logic gates and/or other appropriate hardware techniques.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127.

The I/O and other device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, etc. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number (including zero) of networks (of the same or different types) may be present.

It should be understood that FIG. 1 is intended to depict the representative major components of the computer system 100 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements comprising the various aspects of an embodiment of the invention.

Moreover, while embodiments of the invention have and hereinafter will be described in the context of fully functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of signal-bearing media, which include, but are not limited to:

(1) information permanently stored on a non-rewriteable storage medium, e.g., a read-only memory device attached to or within a computer system, such as a CD-ROM, DVD-R, or DVD+R;

(2) alterable information stored on a rewriteable storage medium, e.g., a hard disk drive (e.g., the DASD 125, 126, or 127), CD-RW, DVD-RW, DVD+RW, DVD-RAM, or diskette; or (3) information conveyed by a communications medium, such as through a computer or a telephone network, e.g., the network 130, including wireless communications.

Such signal-bearing media, when carrying machine-readable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
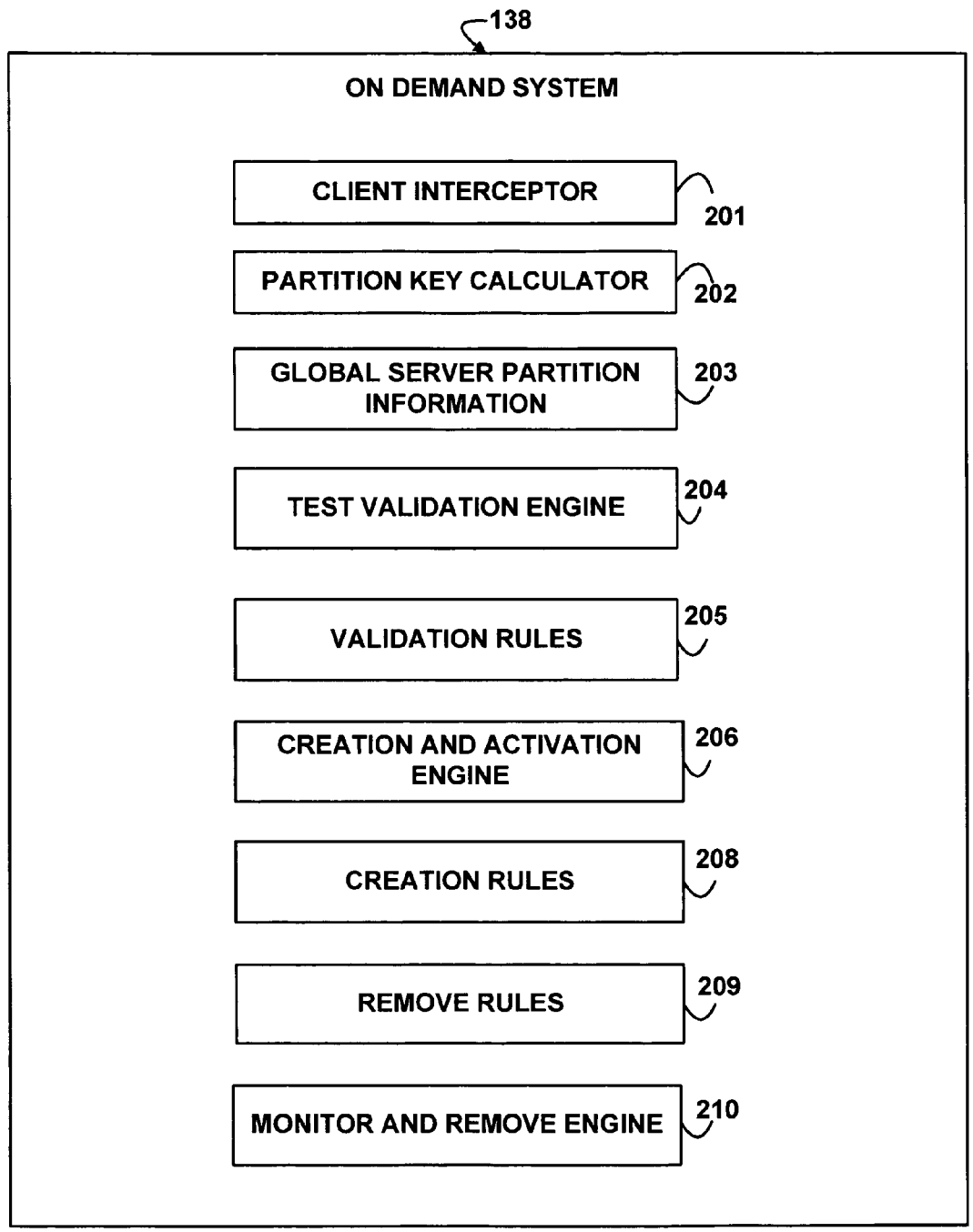
FIG. 2 depicts a block diagram of selected components of an on-demand system, according to an embodiment of the invention.

FIG. 2 depicts a block diagram of selected components of the on-demand system 138, according to an embodiment of the invention. The on-demand system 138 includes a client interceptor 201, a partition key calculator 202, global server partition information 203, a test validation engine 204, validation rules 205, a creation and activation engine 206, creation rules 208, remove rules 209, and a monitor and remove engine 210. The client interceptor 201 receives requests from the clients 133, extracts information from the request, and holds the client requests for server partition manipulation. The partition key calculator 202 determines the intended application server partition 144 for the client request based on the client request context. The global server partition information 203 includes information regarding the application server partitions 144, which in various embodiments may be accessed by both clients and servers.

The test validation engine 204 tests, via the validation rules 205, whether requests from the clients 133 are valid and whether an application server partition 144 exists that is appropriate to receive the request. In various embodiments, the validation rules 205 may be specified by a user, a system administrator, the server 132, the client 133, the application server partitions 144, or the on-demand system 138. In various embodiments, the validation rules 205 may be static or dynamic.

The creation and activation engine 206 creates and activates an application server partition 144 if an appropriate application server partition 144 does not exist to handle the request based on the creation rules 208. The creation rules 208 specify the properties of the application server partition 144, such as CPU and memory load, preferred hosts, and quorum enforcement.

The remove rules 209 specify whether each of the application server partitions 144 is removable and the criteria for removing the application server partitions 144. For example, the remove rules 209 may specify that certain of the application server partitions 144 must always remain active while other of the application server partitions 144 may be deactivated or removed if no applicable request is received within a specified time period, and the time periods may be the same for all application server partitions 144 or may vary between the application server partitions 144. The remove rules 209 may further specify system or partition performance criteria that cause the application server partitions 144 to be removed, such as memory usage, CPU utilization, network or I/O congestion, or any other appropriate criteria. In various embodiments, the remove rules 209 may be specified by a user, a system administrator, the server 132, the client 133, the application server partitions 144, or the on-demand system 138. The monitor and remove engine 210 monitors for the existence of the criteria specified in the remove rules 209 and removes the appropriate application server partition 144 when the criteria associated with that application server partition 144 is met.

In various embodiments, the validation rules 205, the creation rules 208, and the remove rules 209 may be dynamically tuned to improve operational results. For example, if criteria in the remove rules 209 are set so that the monitor and remove engine 210 removes application server partitions 144 quickly when they are unused by requests from the clients 133, this saves memory, but increases the frequency at which the application server partitions 144 are created and removed, which impacts CPU utilization and client response time. In contrast, if the criteria in the remove rules 209 are set so that the monitor and remove engine 210 removes application server partitions 144 slowly when they are unused by requests from the clients 133, this reduces the creating and removing frequency, but increases memory usage and CPU overhead for infrequently-used application server partitions 144. The on-demand system 138 may receive and update the validation rules 205, the creation rules 208, and the remove rules 209 from a user, system administrator, the network 130, the server 132, the client 133, or via any type of programmatic means.

Figure 3:
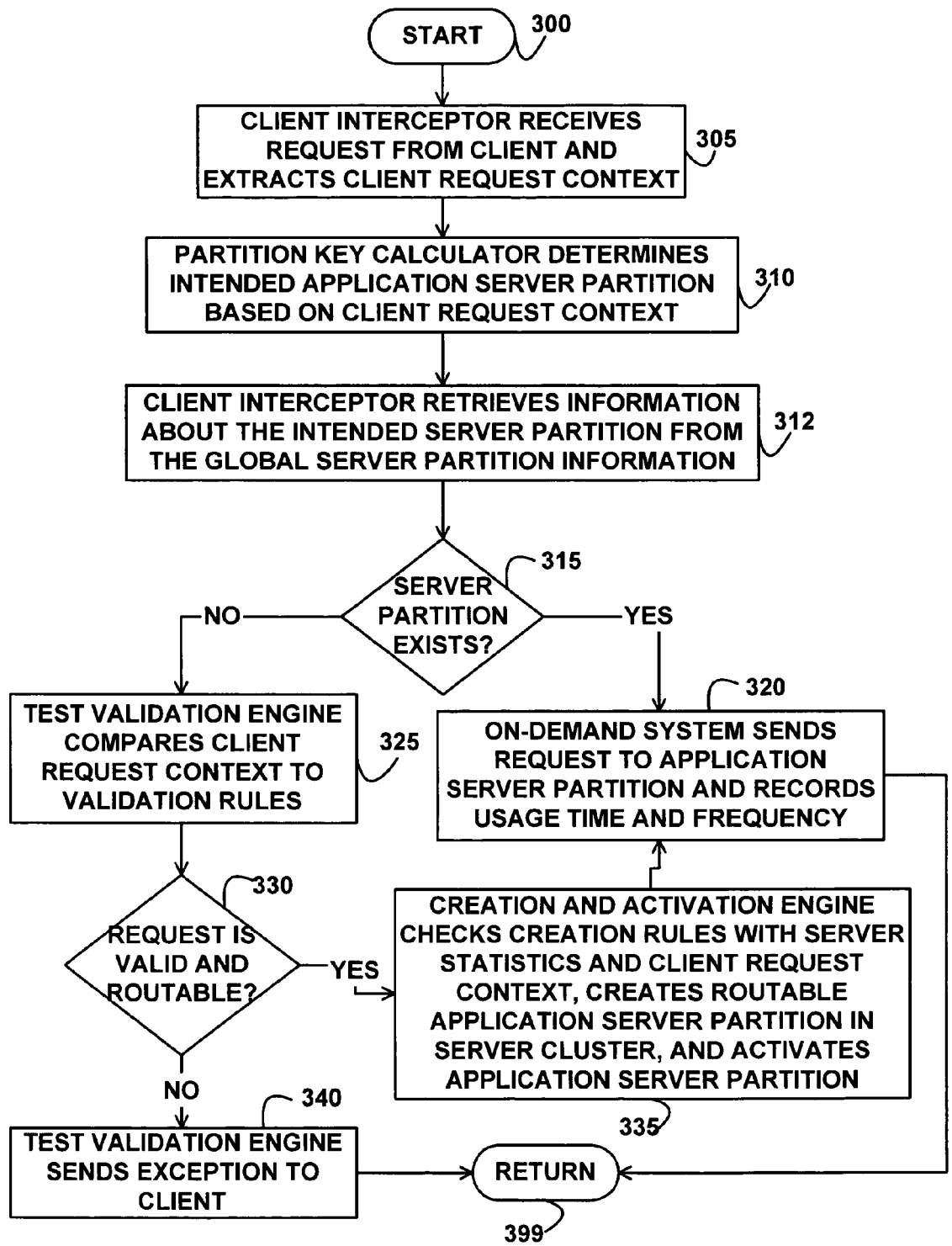
FIG. 3 depicts a flowchart of example processing for the on-demand system, according to an embodiment of the invention.

FIG. 3 depicts a flowchart of example processing for the on-demand system 138, according to an embodiment of the invention. Control begins at block 300. Control then continues to block 305 where the client interceptor 201 receives a request from the client 133 and extracts a client request context from the client request. In various embodiments, the client request context may include the account or user identification of the requester, the graphical location of the user or requester, the type of request or operation (e.g., a buy or sell operation), the type of data on which request operation (e.g., stocks, commodities, goods, services, or any other type of data), or any other information associated with the request.

Control then continues to block 310 where the partition key calculator 202 determines the intended application server partition 144 based on the client request. Control then continues to block 312 where the client interceptor 201 retrieves information regarding the intended application server partition 144 from the global server partition information 203. Control then continues to block 315 where the client interceptor 201 determines whether the intended application server partition 144 already exists based on the global server partition information 203. If the determination at block 315 is true, then the intended application server partition 144 already exists, so control continues to block 320 where the on-demand system 138 sends the request to the determined application server partition 144 and records the usage time and frequency of use of the application server partition 144. Control then continues to block 399 where the logic of FIG. 3 returns.

If the determination at block 315 is false, then the intended application server partition 144 does not already exist, so control continues to block 325 where the test validation engine 204 compares the received client request context to the validation rules 205. Control then continues to block 330 where the test validation engine determines if the client request context is valid and routable based on the comparison. If the determination at block 330 is true, then the received client request context is valid and routable, so control continues from block 330 to block 335 where the creation and activation engine 206 checks the creation rules 208 with server statistics, creates a routable application server partition 144 in a server cluster, and activates the created routable application server partition 144 based on the creation rules 208. Control then continues to block 320, as previously described above.

If the determination at block 330 is false, then the received request is not valid and routable, so control continues from block 330 to block 340 where the test validation engine 204 sends an exception to the client 133, which indicates that the received request context is not valid. Control then continues to block 399 where the logic of FIG. 3 returns.

Figure 4:
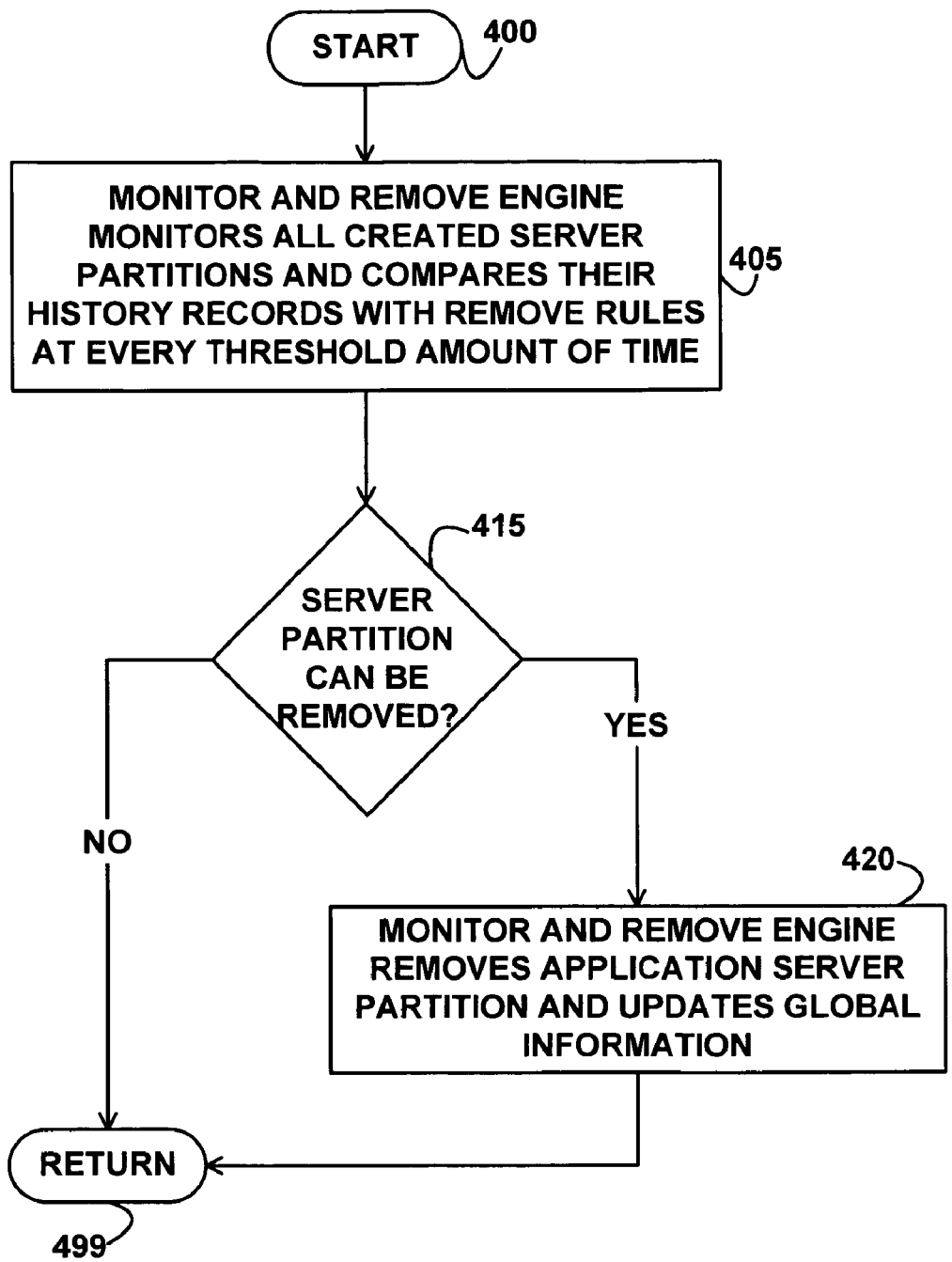
FIG. 4 depicts a flowchart of example processing for a monitor and remove engine of the on-demand system, according to an embodiment of the invention.

FIG. 4 depicts a flowchart of example processing for the monitor and remove engine 210, according to an embodiment of the invention. Control begins at block 400. Control then continues to block 405 where the monitor and remove engine 210 monitors all created application server partitions 144 and periodically compares, every threshold amount of time, the condition of the application server partitions 144 to the criteria specified in the remove rules 209. The condition of the partitions may include history records, such as the usage time and frequency recorded in block 320, as previously described above with reference to FIG. 3 and/or performance criteria, such as CPU and memory utilization.

Control then continues to block 415 where the monitor and remove engine 210 determines whether the application server partition 144 can be removed based on the criteria specified in the remove rules 209 and the condition of the partition. If the determination at block 415 is true, then the application server partition 144 can be removed, so control continues to block 420 where the monitor and remove engine 210 removes or deactivates the application server partition 144 from the server cluster and updates the global server information 203 to indicate that the removed application server partition 144 is no longer capable of receiving requests. Control then continues to block 499 where the logic of FIG. 4 returns.

If the determination at block 415 is false, then the application server partition 144 cannot be removed based on the condition of the application server partition 144 and the criteria specified by the remove rules 209, so control continues from block 415 to block 499 where the logic of FIG. 4 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:
   determining an application server partition based on a request context associated with a request from a client, wherein the request requests an operation, wherein the determining further comprises determining the application server partition based on a type of the operation and a location of the client, wherein the application server partition comprises an application state and application resources that customizes an application for the client;
   determining whether the application server partition exists based on global server partition information, wherein an on-demand system performs the determining whether the application server partition exists;
   if the application server partition exists, sending the request to the application server partition;
   if the application server partition does not exist, determining whether the request context is valid based on a validation rule, wherein the determining further comprises comparing the request context to the validation rule, wherein the on-demand system performs the determining whether the request context is valid;
   if the request context is valid, creating the application server partition in a server cluster based on a creation rule and sending the request to the application server partition; and
   if the request context is not valid, sending an exception to the client.

2. The method of claim 1, further comprising:
   recording a usage time and frequency of use of the application server partition.

3. The method of claim 1, further comprising:
   periodically comparing a remove rule to a condition of the application server partition.

4. The method of claim 3, further comprising:
   if the condition meets the remove rule, removing the application server partition from the server cluster.

5. The method of claim 3, wherein the condition comprises usage time and frequency of use of the application server partition.

6. The method of claim 3, wherein the condition comprises a performance criteria.

7. The method of claim 1, wherein the application server partition comprises a routable unit of the application customized for the client.

8. A method for configuring a computer, comprising:

configuring the computer to determine an application server partition based on a request context associated with a request from a client, wherein the request requests an operation, wherein the configuring the computer to determine further comprises configuring the computer to determine the application server partition based on a type of the operation and a location of the client, wherein the application server partition comprises an application state and application resources that customize an application for the client, wherein the computer is different than the client;

configuring the computer to determine whether the application server partition exists based on global server partition information, wherein an on-demand system in the computer determines whether the application server partition exists;

configuring the computer to send the request to the application server partition if the application server partition exists;

configuring the computer to determine whether the request context is valid based on a validation rule if the application server partition does not exist, wherein the configuring the computer to determine further comprises configuring the computer to compare the request context to the validation rule, wherein the on-demand system determines whether the request context is valid;

configuring the computer to create the application server partition in a server cluster based on a creation rule and send the request to the application server partition if the request context is valid; and configuring the computer to send an exception to the client if the request context is not valid.

9. The method of claim 8, further comprising:

configuring the computer to record a usage time and frequency of use of the application server partition.

10. The method of claim 8, further comprising:

configuring the computer to periodically compare a remove rule to a condition of the application server partition.

11. The method of claim 10, further comprising:

configuring the computer to remove the application server partition from the server cluster if the condition meets the remove rule.

12. The method of claim 10, wherein the condition comprises usage time and frequency of use of the application server partition.

13. The method of claim 10, wherein the condition comprises a performance criteria.

14. The method of claim 10, further comprising:

configuring the computer to receive the validation rule, the creation rule, and the remove rule from a programmatic entity.

* * * * *